Nov. 5, 1935.  A. HORMEL  2,019,973
APPARATUS FOR FEEDING METAL PLATES
Filed Nov. 8, 1934  2 Sheets-Sheet 1
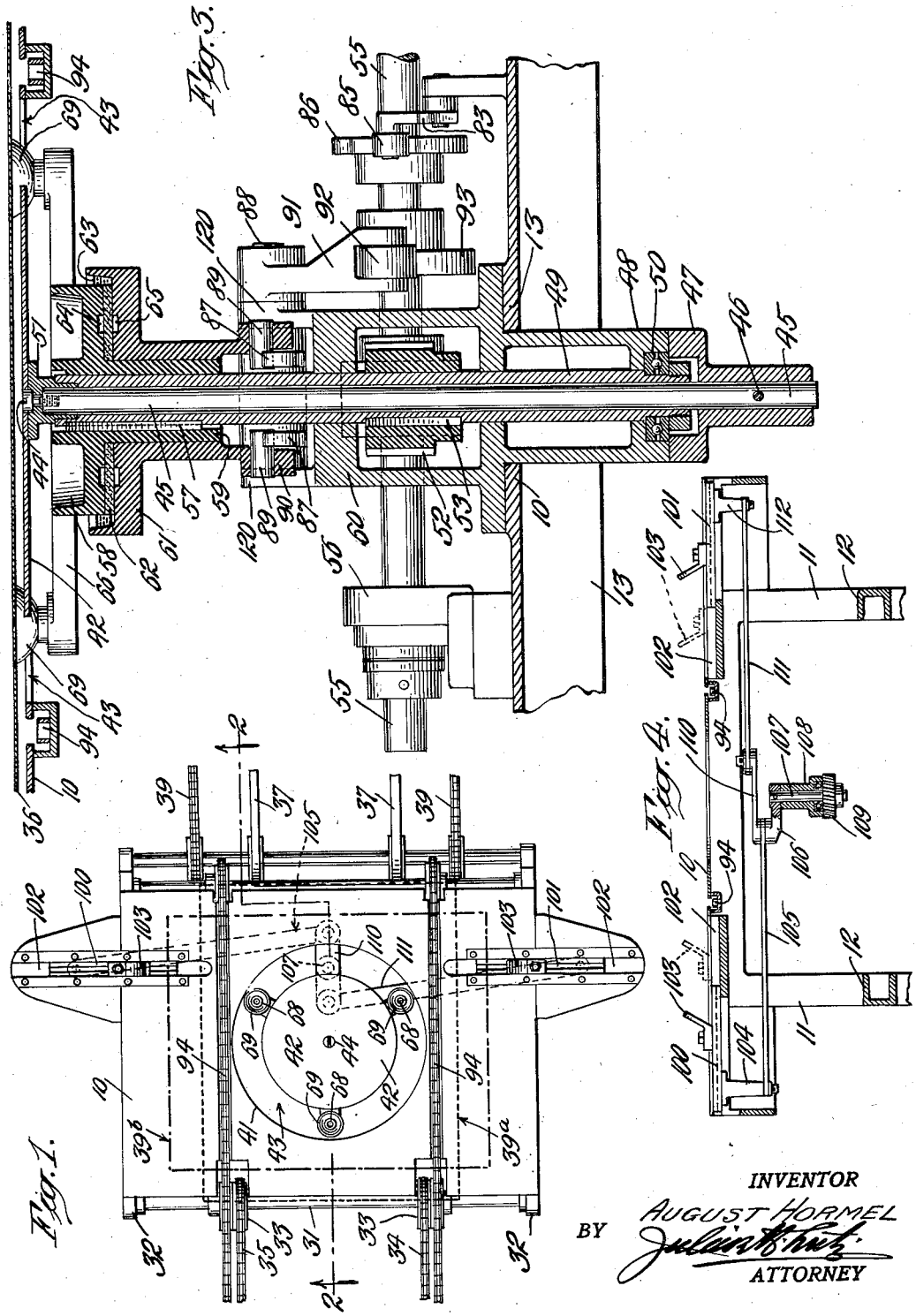
INVENTOR
AUGUST HORMEL
BY
ATTORNEY Nov. 5, 1935.  A. HORMEL  2,019,973
APPARATUS FOR FEEDING METAL PLATES
Filed Nov. 8, 1934  2 Sheets-Sheet 2
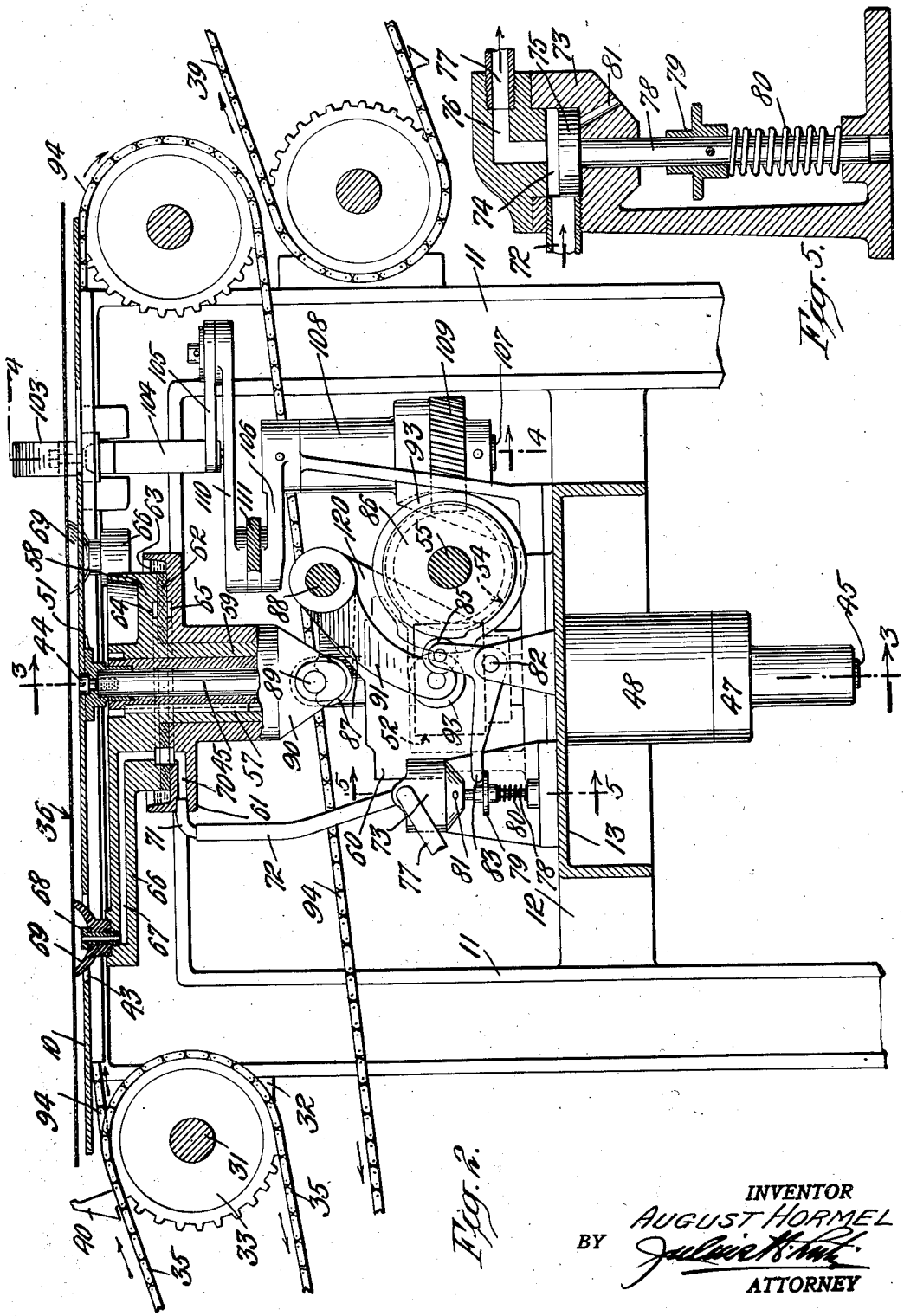
INVENTOR
AUGUST HORMEL
BY
ATTORNEY Patented Nov. 5, 1935

2,019,973

UNITED STATES PATENT OFFICE 2,019,973

APPARATUS FOR FEEDING METAL PLATES

August Hormel, Hoboken, N. J.

Application November 8, 1934, Serial No. 752,059

8 Claims. (Cl. 198—33)

This invention relates to a mechanism for feeding or delivering sheets of metal of the general character shown in my Patent No. 1,914,806, dated June 2, 1933. The object of the invention is to provide a means for automatically supporting and feeding relatively large metallic sheets to an improved turning or rotating device which engages and rotates the sheets to a position at right angles to that which they occupied when fed to the turning means, and then feeds them to a conveyor which transports them to some other apparatus.

The sheets of metal fed by my improved feeding means are usually large rectangular metal sheets which are received upon a conveyor and are moved by the same to a table or similar support. When the sheet reaches the support it is lifted a slight distance above the same by suction means and while in such raised position it is rotated about a vertical axis to a position at right angles to that which it initially occupied on the conveyor. After being rotated, the sheet is lowered, and the suction exerted through the suction means is released, thus freeing the sheet. An aligning device then operates to properly position the sheet for reception by a conveyor by which it is carried away to drying means or to other mechanisms which operate upon it. More specifically, the invention relates to the suction means by which the plate is elevated, rotated and then lowered, and to the aligning means operating in conjunction with the suction means, by which the rotated sheet is straightened for delivery to the conveyor.

In the embodiment of my invention disclosed in the accompanying drawings, Fig. 1 is a plan view of a feeding and sheet-rotating mechanism constructed in accordance with this invention; Fig. 2 is a sectional view on the line 2—2 of Fig. 1, looking in the direction of the arrows; Fig. 3 is a sectional view on the line 3—3 of Fig. 2, looking in the direction of the arrows; Fig. 4 is a sectional view on the line 4—4 of Fig. 2, looking in the direction of the arrows; and Fig. 5 is a sectional view on the line 5—5 of Fig. 2, looking in the direction of the arrows.

In the drawings, 10 indicates a table or other similar support mounted upon a frame mainly composed of the vertical legs 11 suitably braced and connected by the frame elements 12 and 13.

At 31 is shown a shaft mounted in bearings 32 and carrying sprockets 33 over which extend the parallel conveyor chains 34 and 35 which transport the metal sheets 36 to the table 10 where they are engaged by suction means, elevated, swung to a position at right angles to that in which they were received, then lowered and straightened by aligning means, and then delivered to belts 37 on which they are shifted by a pair of chains 39 which move them off to other mechanisms or to drying means.

The conveyor chains 34 and 35 are driven from any suitable source of power and these chains each carry lugs 40 which act against the edge of one of the metal plates 36 to force the plate along toward the table 10 and finally deliver it thereon.

The table 10 is provided with a central opening 41 within which is located a fixed disk 42 of smaller diameter than the opening, so that an annular space 43 is formed between the periphery of the disk and the edge of the opening. The disk 42 is secured by the screw 44 to the upper end of a vertical shaft 45 which is pinned at 46 near its lower end in a housing 47 secured to the lower end of a boss 48 extending downwardly from a bearing 60 on the frame member 13. The vertical shaft 45 is a fixed member and is surrounded by a rotatable sleeve 49 supported at its lower end in a thrust bearing 50 mounted in the boss 48. A bushing 51 is located between the upper end of the sleeve 49 and the disk 42, as clearly shown in Fig. 3.

At 52 is a gear which is keyed at 53 on the sleeve 52, said gear meshing with a gear 54 fixed on a drive shaft 55 journalled at its ends in suitable bearings, one of which is shown at 56 in Fig. 3, and driven from a source of power.

Through this arrangement, it will be seen that the sleeve 49 is constantly rotated about the stationary shaft 45. Secured near the upper end of the shaft 45 by the key 57 is a spider 58 which has its central hub 59 slotted to receive the key 57. The spider is capable of vertical movement on the sleeve 49 but rotates with the sleeve. An outer non-rotative member 61 surrounds the spider 58 and the member 61 has its upper cup-shaped portion acting as a seat for the similar upper portion of the spider 58. A gasket 62 is interposed between the cup-shaped portions of the members 58 and 61 to produce a seal between them, and the seal is further assured by means of the liquid 63 contained in the cup-shaped portion of the member 61. The under side of the spider 58 is provided with a groove 64 which registers and co-operates with a similar groove 65 provided in the upper surface of the member 61, to form an air passage through which suction is exerted. The spider 51 is provided with three radially extending hollow arms 66, each of which is provided with a port 67 opening at its outer end through the nipple 68 surrounded by a rubber suction cup 69. The inner end of the port 67 communicates with the air passage composed of the co-operating groves 64 and 65 (Fig. 2), which air passage communicates with a port 70, connecting with a nipple 71, secured to a section of flexible tubing 72. As shown in Fig. 2, the flexible tubing 72 communicates with the interior of a valve housing 73, having a chamber 74 within which a valve 75 is vertically movable. Leading from the chamber 74 is a port 76 from which extends a flexible tube 77 connected to a suitable suction pump. The valve 75 has a stem 78 on which a collar 79 is secured, which receives the upward thrust of the coil spring 80. The coil spring normally thrusts the valve 75 upward to keep the port 76 closed, thereby connecting the tube 72 with an exhaust opening 81. When the valve is in its normal raised position under the impulse of the spring 80, no suction is exerted through the tube 72 and its connected passages.

The means for intermittently depressing the valve 75 consists of a bell crank cam lever pivoted at 82, and having an arm 83 resting on the collar 79 as shown in Fig. 2. The other arm 84 of the lever carries a cam roller 85 which rests against the cam 86 secured on the drive shaft 55. At the proper time the arm 83 is depressed, under the impulse of the cam 86, which causes it to exert downward pressure on the collar 79 against the pressure of the spring 80, causing the valve 75 to be lowered to close the outlet opening 81 and permit communication between the tube 72 and the suction pump to which tube 77 is connected. When the valve 75 is so lowered, suction exerted by the pump will be operative through the tube 72, nipple 71, port 70, passages 64 and 65, and port 67, so that a metal sheet 36, with which the suction cups are then in contact, will be held by said suction cups and rotated.

The rotating spider 58 and vertically movable member 61 are raised and lowered together as a unit by means of a pair of arms 87 secured upon a shaft 88 rotatable in the lugs 120 on bearing 60 and have their outer ends engaging beneath pins 89 secured in and projecting inwardly from lugs 90 formed on the lower end of the member 61. The shaft 88 also carries a cam lever 91 provided with a roller 92, resting against the cam 93 secured on the drive shaft 55. Through this arrangement, the spider 58 and member 61 are raised together as a unit with the spider rotating within member 61, and the suction cups are moved upward through the annular opening 43 in the table to bring said cups into contact with the under face of the sheet 36 then resting upon the table to slightly raise the sheet therefrom. Sheet 36 in its raised position is shown in Figs. 2 and 3, where it will be seen that it is then wholly supported by the suction cups 69 at a slight distance above the upper surface of the table 10. After the sheet has been raised to the elevated position shown in Figs. 2 and 3 and swung, by rotation of the spider 58, to a position at right angles to that in which it was carried to the table 10, the spider 58 is lowered, bringing the sheet to rest upon the table and lugs on the chains 94 engage it and deliver it to the conveyor chains 39 and supporting belts 37 on which it is carried away.

Before being delivered to the conveyor chains 39 and rails 37, the sheet is straightened or aligned by means of an aligning device shown in detail in Fig. 4. It consists of a pair of slides 100 and 101, simultaneously movable to and from one another in guides 102 at the sides of the table 10. Each of the slides 100 and 101 is provided with an upstanding lug 103 which engages the side of the plate to properly align or straighten it. The slide 100 is provided with a downwardly extending arm 104 which has its lower end pivotally connected to one end of a link 105 having its opposite end attached to the end of a crank arm 106 secured to the upper end of a shaft 107, mounted in a bearing 108 supported on frame member 13. The lower end of the shaft 107 is provided with a gear 109 which meshes with and is driven by the gear 54 on the drive shaft 55. The crank 106 is provided with an extension 110 which has its end connected to a link 111 connecting with a downwardly extending arm 112 on the slide 101. By rotation of the shaft 107, the slides 101 are moved toward one another to contact with the edges of and straighten or align the sheet 36 and they then separate or move away from one another permitting the sheet to be engaged by the conveyor chains 39 and moved away thereby.

Briefly, the operation of the apparatus is as follows:

A metal sheet to be fed is carried by the chains 34 and 35 along suitable supporting rails until it reaches the table 10 where it is received in the position indicated at 39a in Fig. 1. It is then ready to be swung to a position at right angles to that in which it is brought to rest upon the table, its position after rotation being indicated at 39b. When the sheet reaches the table, the spider 58 is elevated by means of the arms 88 to bring the suction cups 69 into contact with the under side of the sheet. When the suction cups 69 contact with the sheet 36, the arm 83 is depressed and this lowers the valve 75 causing suction to be exerted through the cups 69 so that they securely hold the sheet. As upward movement of the spider continues, the sheet is lifted from the surface of the table to the raised position shown in Figs. 2 and 3, and the rotary movement of the spider 58 causes the sheet to be swung about a vertical axis until it reaches the position indicated by 39b, by which time the spider 58 has descended and suction through cups 69 has ceased. The aligning device, consisting of the slides 100 and 101 and associated parts, are then moved toward one another to align or straighten the plate. The chains 94 move the plate to the right in Fig. 1, until it is received on the chains 39 and belts 37 which carry it away. It will be understood that the various mechanisms herein described are suitably synchronized so that the sheets are speedily fed to the table, lifted, rotated about a vertical axis, lowered and engaged by the chains 94 and moved thereby to chains 39 which carry them away.

What I claim is:

1. An apparatus for feeding metal plates comprising, means for receiving and conveying a plate, a support to which the plate is moved by the conveying means and on top of which the plate is brought to rest, the support being provided with an opening, suction means located below the support for engaging the plate when the plate is received on the support and raising the plate therefrom, means for rotating the suction means to cause the plate engaged thereby to be rotated to a position at an angle to that occupied by it when being conveyed, and means for raising and lowering the suction means.

2. An apparatus for feeding metal plates comprising, means for receiving and conveying a plate, a support to which the plate is moved by the conveying means, suction means below the support, and means for raising the suction means to cause it to pneumatically engage the under side of the plate on the support and lift the plate therefrom, means for rotating said suction means when the plate is elevated, and means for lowering the suction means to bring the plate down on the table in a position at right angles to that occupied by it before being lifted from the table by the suction means.

3. An apparatus for feeding metal plates comprising, means for receiving and conveying a plate, a support to which the plate is moved by the conveying means, suction means below the support, means for raising the suction means to cause it to pneumatically engage the under side of the plate on the support and lift the plate therefrom, means for rotating said suction means when the plate is elevated, means for lowering the suction means to bring the plate down on the table in a position at right angles to that occupied by it before being lifted from the table by the suction means, and aligning means for engaging the edges of the plate after it has been moved about its axis, to align the plate.

4. An apparatus for feeding metal plates comprising, means for conveying a plate, a support to which the plate is moved by the conveying means, rotating suction means, the support having an annular opening, means for raising the suction means upwardly through said opening to cause said means to pneumatically engage the under face of the plate and raise said plate from the surface of the support, and means for rotating the suction means to cause the plate engaged thereby to be rotated with the suction means to a position at right angles to that occupied by the plate while disposed on the conveying means.

5. An apparatus for feeding sheet metal plates comprising a table to which a plate is fed, said table having an annular opening, a suction device rotatably mounted below the table and having suction arms terminating in cups movable upwardly through the opening to engage the under face of a plate located on the table, means for intermittently exerting suction through the arms and cups, and means for raising and lowering said arms and cups.

6. An apparatus for feeding sheet metal plates comprising, a table to which a plate is fed, said table having an annular opening, a suction device rotatably mounted below the table and having suction arms terminating in cups movable upwardly through the opening to pneumatically engage the under face of a plate located on the table, means for intermittently exerting suction through the arms and cups, means for intermittently raising and lowering the arms and cups, and means for engaging and aligning the plate after it has been raised, rotated and lowered by the suction arms and cups.

7. An apparatus for feeding sheet metal plates comprising, a table formed with an opening, rotatable suction means below the table provided with suction elements in registration with said opening, means for moving said suction elements upwardly through the opening and above the upper surface of the table, means for rotating said suction means, and means for lowering said suction elements through the opening.

8. An apparatus of the character described comprising a table formed with an opening, a suction device and means for rotating the same, means on said suction device in registration with the opening, means for intermittently exerting suction through the suction device, and means for intermittently raising and lowering the suction device, said means raising parts of said suction device above the upper surface of the table at the limit of its upward movement.

AUGUST HORMEL.